Sept. 26, 1950 — H. W. PETERSON, JR — 2,523,589
TIME AND DISTANCE COMPUTER
Filed May 16, 1950
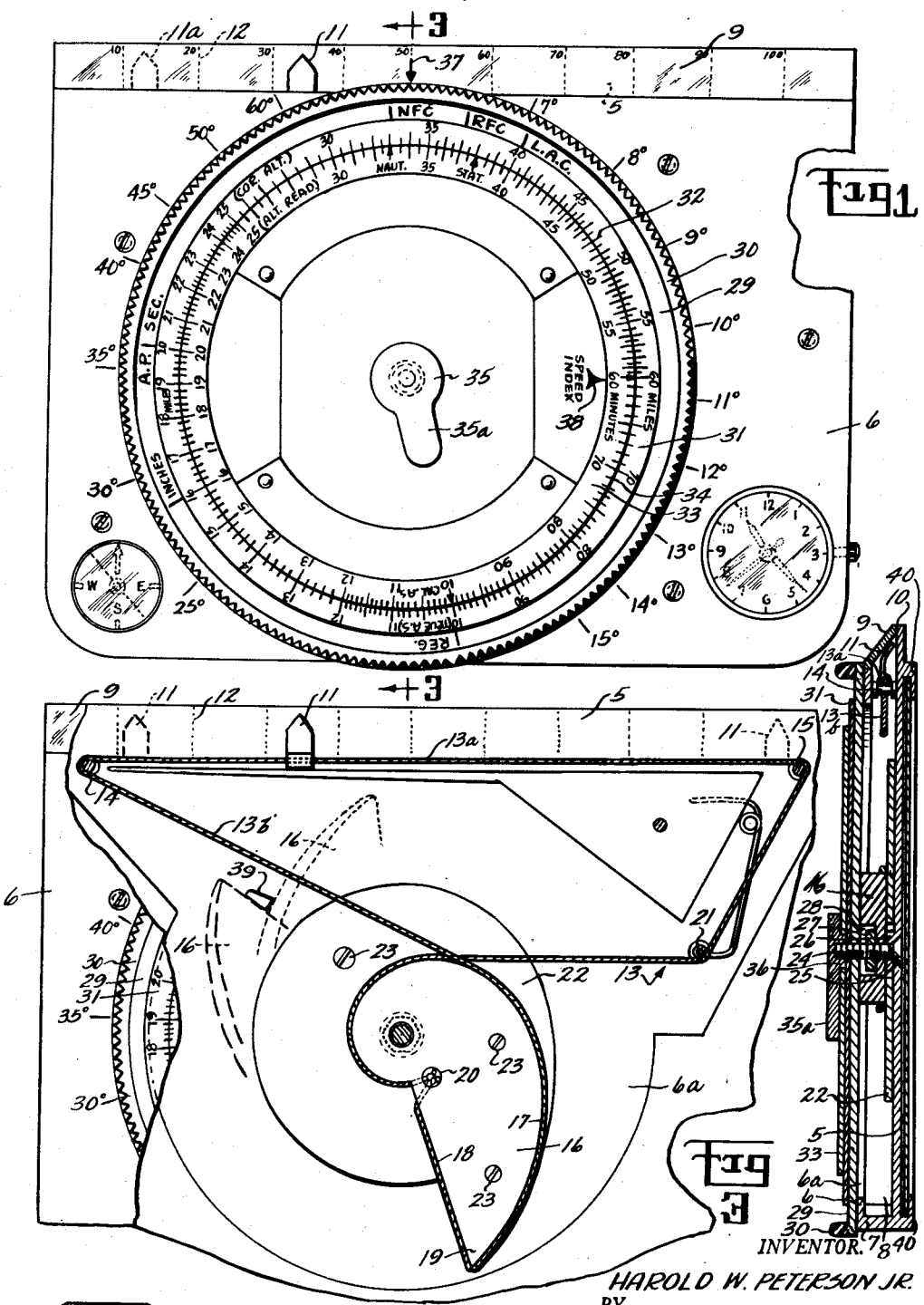
INVENTOR.
HAROLD W. PETERSON JR.
BY
Edward Reed
ATTORNEY.

Patented Sept. 26, 1950

2,523,589

UNITED STATES PATENT OFFICE 2,523,589

TIME AND DISTANCE COMPUTER

Harold W. Peterson, Jr., Fairborn, Ohio

Application May 16, 1950, Serial No. 162,226

6 Claims. (Cl. 235—61)

This invention relates to a time and distance computer and is designed primarily for use in aerial navigation, but is not limited to such use.

One object of the invention is to provide a computer by which the pilot of an airplane, during flight, may determine the distance he has traveled, the distance from his present position to a subsequent check point, and the time that will be required to reach said check point.

A further object of the invention is to provide a computer by which a pilot may determine his distance from his starting point and the average rate of speed at which he traveled that distance, and by a further manipulation of the instrument determine his distance from his destination, or a given check point, and the time required to travel that distance at his then rate of speed, and will thus be able to inform the control station at said destination or check point of his then position and of the estimated time of his arrival.

A further object of the invention is to provide such a computer by which said computations may be quickly and accurately effected.

Other objects of the invention may appear as the computer is described in detail.

In the accompanying drawings Fig. 1 is a top plan view of a computer embodying the invention, partly broken away; Fig. 2 is a similar view with the dials and a portion of the supporting structure broken away to show the interior mechanism; and Fig. 3 is a section taken on the line 3—3 of Fig. 1.

In these drawings I have illustrated a preferred embodiment of the invention and have shown a computer of a construction adapted to be superposed on a map of a suitable scale and including an indicator movable in a direction corresponding to the line of flight from one point on said map to a second point thereon; a rotatable device having thereon distance and time indications and, in its main characteristic, similar to a circular slide rule, and means actuated by said rotatable device for moving said indicator at a rate of movement with relation to the movement of said rotatable device such that the latter will indicate the ground distance between said two points on the map; said rotatable device also having means for determining the rate of speed at which the plane traveled between said points. It is to be understood however, that the computer as a whole, as well as the several parts thereof, may take various forms and may be adapted to effect various computations.

In the form here illustrated the computer is of such size and form that it may be easily handled and manipulated by the pilot of an airplane while in flight. The computer comprises a supporting structure, or casing, including a back wall 5, a front wall 6 connected to said back wall in spaced relation thereto by a bottom wall 7, side walls 8, and a top wall 9 which is preferably transparent and inclined from the upper edge of the front wall to the upper edge of the back wall. The converging edges of the top wall and the back wall form a straight edge 10 and the supporting structure is adapted to be superposed on a map of a suitable scale with said straight edge extending in a direction corresponding to the line of flight and with a fixed part of said straight edge above the starting point of the flight, preferably this fixed part is the left hand end of the straight edge, as shown in Fig. 1. An indicator 11 is mounted on the supporting structure for movement lengthwise of said straight edge to a position indicating on the map the then location of the plane, or a location above which the plane is about to pass. The straight edge is preferably provided with distance graduations 12 and in the present instance these graduations are calibrated in units of ten miles each. In the present computer the operating mechanism is such that the initial, or home, position of the indicator is spaced a short distance from the starting point at the end of the straight edge and it is here shown at 11a as spaced thirteen miles from the starting point. The limit of movement of the indicator from the starting point is one hundred miles and, therefore, the range of operation of the present apparatus is between thirteen miles and one hundred miles. It is to be understood that this range of operation may be varied, by changing the length of the straight edge or by increasing the number of miles in the several units and correspondingly changing the operating mechanism.

Any suitable mechanism may be provided for actuating the indicator 11 and in the present mechanism it is actuated by a cable 13 supported within the casing on suitable guides, such as small diameter pulleys 14 and 15, which are so arranged as to provide the cable with a straight line portion 13a adjacent to and parallel with the straight edge of the casing. The indicator 11 is secured to this straight line portion of the cable and is preferably arranged within the casing in line with the transparent edge portion 9 of the casing. The cable is operated by a cam 16 which is pivotally mounted on the supporting structure for movement about an axis adjacent to but spaced from one end thereof. The cam is a modified logarithmical cam and comprises a curved edge 17 extending lengthwise of the cam and about the pivoted end thereof, and a substantially radial edge 18. The edge portions 17 and 18 converge substantially to a point 19 at that end of the cam opposite its pivotal axis. An end portion 13b of the cable extends from the guide 14 across the point of the cam and along the radial edge thereof and is rigidly secured to the cam adjacent the inner end of said radial edge, as shown at 20. The other end portion of the cable extends from the guide 15 across the cam and about the curved end thereof to a point above the pivotal axis of the cam and is there anchored to the cam, preferably at the same point 20, that the other end of the cable is anchored. Preferably a spring actuated guide 21 engages the cable between the guide 15 and the cam to maintain the same taut. The cam is here shown as rigidly secured to a plate 22, as by screws 23, and the plate and the cam are rotatably supported by and, in the present instance, rigidly secured to a rotatable member mounted in the back wall 5 of the supporting structure. In the present construction this rotatable member is a screw 24 and the back wall is provided with a tapered opening 25 to receive the tapered head of the screw and form a bearing therefor. Preferably the back wall is provided on its inner side with a thickened portion 26 into which the tapered recess 25 extends to provide a bearing of proper length. The plate 22 is provided with a recess, or opening, to receive the thickened portion of the back wall and the plate 22 and the cam are rigidly secured to the screw by a nut 27, the front surface of the cam being preferably provided with a recess 28 to receive the nut. Thus the cam and the plate are clamped against the head of the screw for rotation therewith but the plate 22 has little or no frictional contact with the back wall and is free to rotate with relation thereto. A fixed stop 39 positively limits the movement of the cam in both directions.

The front wall 6 of the supporting structure has a relatively large opening 6a and rotatably supported on the supporting structure is a disc 29 of a diameter slightly greater than the diameter of that opening and having a circumferential knurled edge portion 30 by which it may be rotated by a finger or thumb of the operator. This disc is rigidly secured to the screw 24 for rotation therewith, as will hereinafter appear, and constitutes a dial having on the front portion thereof a series of distance graduations. These graduations may be placed directly upon the face of the disc but they are preferably placed upon a separate disc 31 of a diameter slightly less than the diameter of the disc 29 and connected with the disc 29 for rotation therewith, but which can, if desired, be rotatably adjusted with relation to the disc 29. The dial is provided adjacent the peripheral edge thereof with a series of distance graduations 32 which are, in the present instance, calibrated in miles. Mounted on the supporting structure in front of the mileage, or distance, dial 29—30 is a second dial 33 which is rotatable about the axis of the mileage dial and is provided adjacent the peripheral edge thereof with a series of time graduations 34 which are preferably calibrated in minutes. This second dial 33 is so connected with the mileage dial that when unrestrained it rotates with that dial but it may be rotated with relation to the mileage dial. In the present instance the mileage and time dials are rigidly secured to the rotatable element, or screw 24, for rotation therewith. The disc 29 may, if desired, be threaded on this screw and in any event the two dials are clamped tightly to the screw by a nut 35 on the forward end of the screw. The nut is provided with an inwardly extending part, or boss, 36, which extends through the opening in the time dial and bears against the mileage dial to clamp the same to the screw. If desired, a separate washer may be substituted for the boss 36. Preferably the disc 29 of the mileage dial bears against the front face of the cam and it may, if desired, be rigidly secured thereto, as by the screws 23 which connect the cam to the plate 22. Due to the boss 36 the nut 35 has a relatively light contact with the time dial 33, this contact being sufficient to cause the time dial to rotate with the mileage dial when it is unrestrained but permits the time dial to be adjusted about its axis with relation to the mileage dial. The nut 35 is preferably provided with a radial extending part, or thumb piece, 35a, by means of which it may be easily manipulated. Thus the rotation of the mileage dial causes the graduations thereof to move across a fixed indication on the straight edge of the supporting structure and preferably in the vertical plane of the axis of rotation of the dial, this indication being here shown as an arrow 37. The cam is accurately developed to move the indicator 11 at a rate of movement so related to the rate of movement of the mileage dial that in all positions of the movable indicator that graduation on the mileage dial which is in line with the fixed indication 37 will represent the ground distance between the starting point and the check point indicated on the map by the indicator. The time dial is also provided with a separate speed index pointer 38 which moves along the mileage graduations on the mileage dial and is so positioned with relation to the mileage graduations and the time graduations that when the time dial is adjusted with relation to the mileage dial to move into line with the fixed indication 37 that time graduation which represents the time which was required for the plane to move from the starting point to the check point on the map the mileage indication which is indicated by the speed index pointer 38 will represent the average miles per hour at which the plane traveled between the two points.

When the pilot wishes to ascertain his distance from his destination, or from a second check point, he places the computer on the map with the end of the straight edge above the starting point, rotates the mileage dial to move the indicator 11 to a position above a check point on the map above which the plane is then located, or above which the plane is about to pass, and thus indicates on the mileage dial the distance traveled. Knowing the time at which the flight started he ascertains the lapsed time and adjusts the time dial to bring into line with the fixed indication the time indication corresponding to the lapsed time. With the two dials in this position the speed index pointer 38 will indicate on the mileage dial the miles per hour. For example, as shown in Fig. 1 the mileage dial is set to show a traveled distance of 34 miles and the time dial is set to indicate that thirty-four minutes were required to travel that distance. Therefore, the speed index indicates sixty miles per hour. In some instances it may be necessary in reading the miles per hour to add a cipher to the indication miles. For example, if the mileage dial is set to indicate traveled distance of seventy miles and the time dial is set to indicate a lapsed time of thirty minutes, the speed index pointer will indicate fourteen on the mileage dial. The pilot knowing that this could not be the correct reading, reads the indication as one hundred forty miles, which is the correct miles per hour. After having determined the distance traveled and the speed at which it is traveled, the pilot may wish to ascertain his distance from his destination and the time it will take him to reach his destination. He therefore moves the computer, while retaining the dials in their adjusted positions, to a second position on the map in which the starting end of the straight edge of the computer is above the check point at which his computations were made and, with the straight edge extending across his destination, he then rotates the dials in unison to move the movable indicator 11 to a position above his destination. When the dials have been so adjusted the mileage graduation which is in line with the fixed indication on the straight edge will represent the distance to his destination and the time graduation on the time dial which is in line with the fixed indication will represent the time required to travel that distance at his then rate of speed. If the distance between the check point and the destination is greater than the capacity of the computer, the pilot may make his first computation from the first check point to a second check point between the first check point and his destination, and then using the data provided by that computation, he can make a second computation to determine the distance and time between the second check point and his destination, or a third check point. This procedure can of course be repeated as often as necessary or desired. If desired the back wall 5 may be provided with guides 40 to receive a card on which the data of the computations may be entered.

The computer must of course be used upon a map of a scale for which it is designed. In the present instance the computer is primarily designed for use on a standard regional flight chart having a scale of 1 to 1,000,000. However, by adjusting the mileage dial with relation to the cam according to certain indications appearing on the margin of the mileage dial, outwardly beyond the mileage graduations, the computer can be adapted to other maps. For instance, the designation NFC on the margin of the dial indicates a standard navigation flight chart and by adjusting the mileage dial with relation to the cam to a position in which the ten mile graduation is in line with the mark associated with the letters NFC the dial is so set that the mileage readings will correspond to the scale on the navigation flight chart. By making a similar adjustment with relation to the marks associated with the other chart indications on the dial the computer can be set for use with various other standard charts.

The numerals 7° to 60° appearing on the base and spaced about the dial are for use in solving radio compass time and distance problems.

It is to be understood that the distance graduations need not be calibrated in miles and that the time graduation need not be calibrated in minutes, but these terms have been used for convenience of description and the term "miles" is used to represent any desired unit of distance and the term "minutes" is used to represent any desired unit of time.

While I have shown and described one embodiment of my invention, it is to be understood that I do not desire to be limited to the details thereof as various modifications may occur to a person skilled in the art.

Having fully shown and described my invention, what I claim as new and desire to secure by Letters Patent is:

1. A time and distance computer for airplanes comprising a supporting structure adapted to be positioned on a map of a suitable scale with a fixed part thereof above the starting point of the flight, an indicator supported on said structure for movement in a line corresponding to the direction of flight, said structure having thereon a fixed indication, a dial supported on said structure for rotation about a fixed axis and having thereon a series of graduations calibrated in miles and movable across said fixed indication, means for simultaneously moving said indicator from an initial position adjacent said part of said structure to a selected check point on said map and rotating said dial at such relative rates of movement that the graduation on said dial which is in line with said fixed indication represents the ground distance between said starting point and said check point, a second dial movable about the axis of said mileage dial and having a series of graduations calibrated in minutes, said second dial being movable with relation to said mileage dial to move into line with said fixed indication the time graduation which represents the lapsed time between said points, said time dial having thereon a pointer movable along said series of mileage graduations and so positioned with relation to the graduations on said dials that the mileage graduation indicated by said pointer represents the miles per hour at which said airplane traveled from said starting point to said check point.

2. A time and distance computer for airplanes comprising a supporting structure adapted to be positioned on a map of a suitable scale with a fixed part thereof above the starting point of the flight, an indicator supported on said structure for movement in a line corresponding to the direction of flight, said structure having thereon a fixed indication, a dial supported on said structure for rotation about a fixed axis and having thereon a series of graduations calibrated in miles and movable across said fixed indication, means for simultaneously moving said indicator from an initial position adjacent said part of said structure to a selected check point on said map and rotating said dial at such relative rates of movement that the graduation on said dial which is in line with said fixed indication represents the ground distance between said starting point and said check point, a second dial movable about the axis of said mileage dial and having a series of graduations calibrated in minutes, said second dial being movable with relation to said mileage dial to move into line with said fixed indication the time graduation which represents the lapsed time between said points, said time dial having thereon a pointer movable along said series of mileage graduations and so positioned with relation to the graduations on said dials that the mileage graduation indicated by said pointer represents the miles per hour at which said airplane traveled from said starting point to said check point, said computer being movable as a unit to locate the aforesaid fixed part of said structure above said check point with said dials in said adjusted positions, and said dials being rotatable in unison to move said indicator to a position above a second check point on said map, whereby the mileage graduation which is then in line with said fixed indication represents the distance between said check points and the time graduation which is in line with said fixed indication represents the time required to travel said distance at the then rate of speed.

3. A time and distance computer for airplanes comprising a supporting structure adapted to be superposed on a map of a suitable scale with a straight line portion thereof extending in the line of flight and with one end of said portion above a starting point, said portion having a fixed indication between the ends thereof, an indicator supported on said structure for movement lengthwise of said straight line portion of said structure, a manually operated dial supported on said structure for rotation about a fixed axis and having thereon a circular series of distance graduations calibrated in miles, means actuated by the rotation of said dial for moving said indicator at a predetermined rate of movement with relation to the rate of movement of said dial such that the mileage graduation on said dial which is in line with said fixed indication represents the ground distance between said starting point and the point on said map above which said indicator is then located, a second dial supported on said structure, having a series of time graduations calibrated in minutes and rotatable with relation to said first mentioned dial to move into line with said fixed indication a time graduation representing the time required for said airplane to travel from said starting point to the point on said map indicated by the position of said movable indicator, said second dial also having thereon a pointer movable along said mileage graduations and so positioned with relation to the graduations on said dials that the mileage graduation indicated by said pointer in any relative positions of said dials represents the miles per hour at which said airplane traveled from said starting point to the point then indicated by said movable indicator.

4. A time and distance computer for airplanes comprising a supporting structure adapted to be superposed on a map of a suitable scale with an edge portion thereof extending in the line of flight and with one end of said edge portion above the starting point of said flight, said edge portion having a fixed indication between the ends thereof, a dial supported on said structure for rotation about a fixed axis and having thereon a circular series of distance graduations calibrated in miles, a cam connected with said dial for rotation thereby, a cable connected with said cam for movement thereby, means for movably supporting said cable with a portion thereof extending lengthwise of said edge portion of said structure, an indicator connected with said portion of said cable for movement therewith, the contour of said cam being such that the mileage graduation which is in line with said fixed indication represents the ground distance between said movable indicator and said end of said edge portion of said structure, a second dial supported on said structure, having a circular series of time graduations calibrated in minutes and rotatable with relation to said first mentioned dial to move into line with said fixed indication a time graduation representing the time required for said airplane to travel from said starting point to the point on said map indicated by the position of said movable indicator, said second dial also having thereon a pointer movable along said mileage graduations and so positioned with relation to the graduations on said dials that the mileage graduation indicated by said pointer in any relative positions of said dials represents the miles per hour at which said airplane traveled from said starting point to the point then indicated by said movable indicator.

5. A time and distance computer for airplanes comprising a supporting structure adapted to be superposed on a map of a suitable scale with an edge portion thereof extending in the line of flight and with one end of said edge portion above the starting point of the flight, said edge portion having a fixed indication between the ends thereof, a dial supported on said structure for rotation about a fixed axis and having thereon a circular series of distance graduations calibrated in miles, a cam connected with said dial for rotation thereby, a cable connected with said cam for movement thereby, means for movably supporting said cable with a portion thereof extending lengthwise of said edge portion of said structure, an indicator connected with said portion of said cable for movement therewith, the contour of said cam being such that the mileage graduation which is in line with said fixed indication represents the ground distance between said movable indicator and said end of said edge portion of said structure, a second dial supported on said structure, having a circular series of time graduations calibrated in minutes and rotatable with relation to said first mentioned dial to move into line with said fixed indication a time graduation representing the time required for said airplane to travel from said starting point to the point on said map indicated by the position of said movable indicator, said second dial also having thereon a pointer movable along said mileage graduations and so positioned with relation to the graduations on said dials that the mileage graduation indicated by said pointer in any relative positions of said dials represents the miles per hour at which said airplane traveled from said starting point to the point then indicated by said movable indicator, said computer being movable as a unit to locate said end of said edge portion of said structure above the point previously indicated by said indicator with said edge portion extending in the direction of flight and with said dials in said adjusted positions, said dials being rotatable in unison to move said indicator to a position above a point on said map beyond said previously indicated point, whereby the mileage graduation which is then in line with said fixed indication represents the distance between said points, and the time graduation which is in line with said fixed indication represents the time required to travel said distance at the then rate of speed.

6. A time and distance computer for airplanes comprising a supporting structure adapted to be superposed on a map of a suitable scale with an edge portion thereof extending in the line of flight and with one end of said edge portion above the starting point of the flight, said edge portion having a fixed indication between the ends thereof, a dial supported on said structure for rotation about a fixed axis, having thereon a circular series of distance graduations calibrated in miles, a logarithmic cam connected with said dial for rotation therewith about the axis thereof, a cable connected at both ends with said cam and extending about the cam surface thereof, guides supporting a portion of said cable in a position lengthwise of said edge portion of said structure, an indicator connected with said portion of said cable for movement therewith, the contour of said cam being such that the mileage graduation which is in line with said fixed indication represents the ground distance between said movable indicator and said end of said edge portion of said structure, a second dial supported on said structure for rotation about the axis of the first mentioned dial and having a circular series of time graduations calibrated in minutes, said second dial being rotatable with relation to said first mentioned dial to move into line with said fixed indication a time graduation representing the time required for said airplane to travel from said starting point to the point indicated on said map by the position of said movable indicator, said second dial also having thereon a pointer movable along said mileage graduations and so positioned with relation to the graduations on said dials that the mileage graduation indicated by said pointer in any position of said time dial represents the miles per hour at which said airplane traveled from said starting point to the point then indicated by said movable indicator.

HAROLD W. PETERSON, Jr.

No references cited.